Sept. 7, 1937.　　　　F. G. LOGAN　　　　2,092,319
ELECTRIC CONTROLLING APPARATUS
Filed Dec. 20, 1934
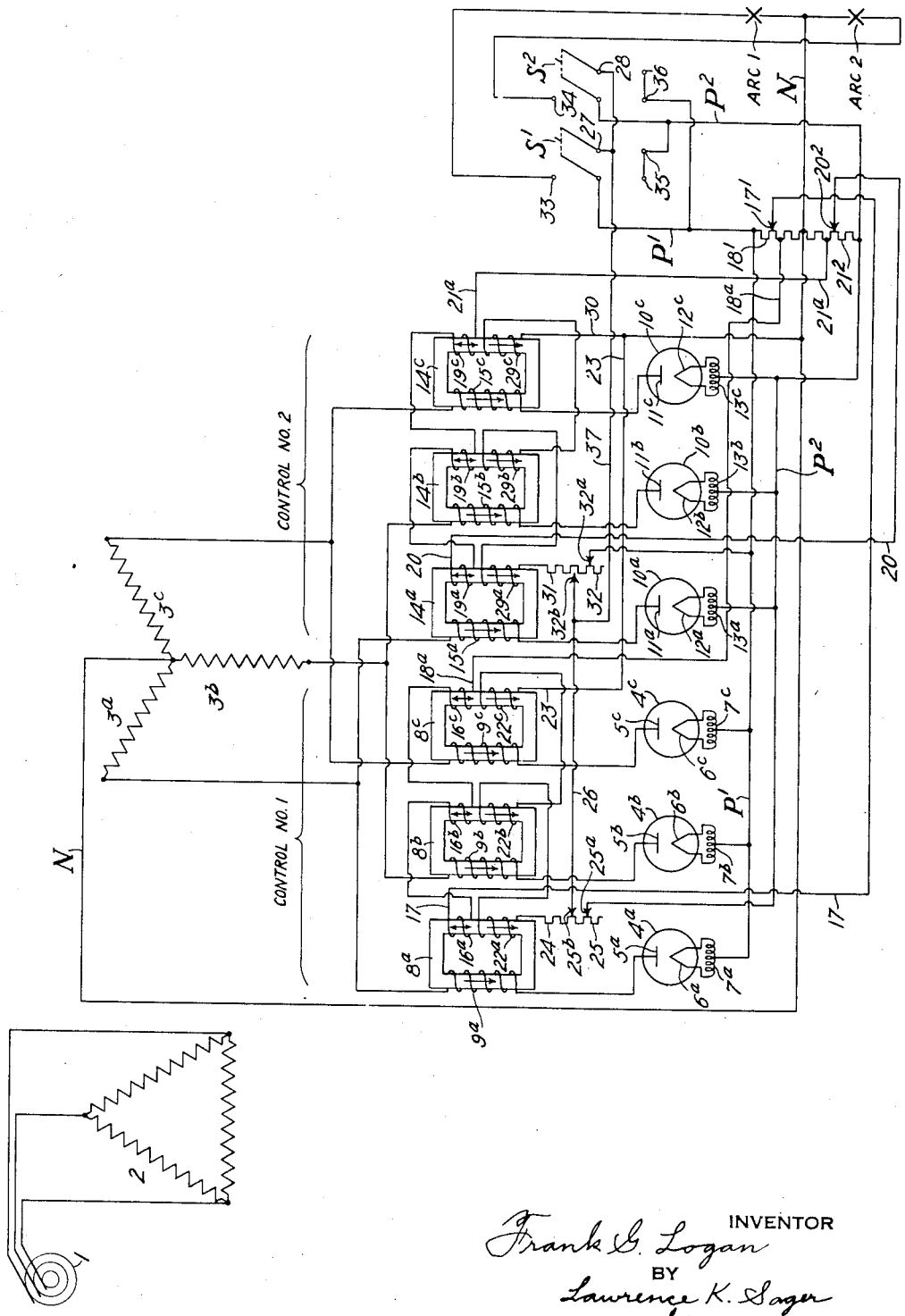
INVENTOR
Frank G. Logan
BY
Lawrence K. Sager
his ATTORNEY Patented Sept. 7, 1937

2,092,319

UNITED STATES PATENT OFFICE

2,092,319

ELECTRIC CONTROLLING APPARATUS

Frank G. Logan, Mount Vernon, N. Y., assignor to Ward Leonard Electric Company, a corporation of New York Application December 20, 1934, Serial No. 758,414

16 Claims. (Cl. 175—363)

This invention relates to an improved method and apparatus for operating a plurality of loads on different consumption circuits from a single alternating current source, such as a transformer, and wherein rectifiers are used for respectively supplying uni-directional current to the different consumption circuits. The invention is particularly applicable to the operation of projection arc machines where the arcs serve as the light source, as in motion picture equipment.

In the use of such projection machines and in cases analogous thereto, it has been common practice to provide a transformer for each load circuit with its respective rectifying and control apparatus, each equipment working independently of each of the others and being controlled independently. This has been necessary because ordinarily one supply transformer cannot be used to operate two or more regulated rectifiers because a change of load on the transformer will alter the effective output of one rectifier when the others are loaded or unloaded. This is due to the regulation of the transformer under change of load and likewise is due to change in the secondary wave form. Another difficulty arises causing a change in output due to anode reactor regulation of one machine when another machine is either placed in or removed from a parallel connection which causes a resultant change in current through the anode reactor, or reactors, of the first machine.

The main object of the present invention is to permit the operation of such loads from a single alternating current source, such as a transformer and thereby avoid the expense of duplication thereof and of wiring connections. Another object is to so interrelate the action of the different machines in their controlling effect upon the others that when any one of them is operated singly or simultaneously or not operated as individual machines, the controlling effect will be such as not to materially disturb the voltage and effective current applied to the rectifier of any one of the other machines. Another object is to permit the operation of the projector machines in parallel with each other from the same common source without materially disturbing the effective voltage and current applied to the rectifying apparatus of each machine. Another object is to reduce the cost of operation of the equipment. Another object is to reduce the load imposed upon the rectifiers during the major portion of the operating period so that the life of the rectifiers will be greatly prolonged and so reduce the cost of their replacements. Other objects and advantages of this invention will be understood from the following description and accompanying drawing illustrating one embodiment thereof.

The drawing is a diagram of a preferred embodiment of the invention.

The drawing shows an application of the invention to the control of two projector arc machines, the arc of one machine being indicated as arc 1 and the arc of the other machine being indicated as arc 2. The three-phase source 1 is indicated supplying a three-phase transformer having the primary windings 2 connected in delta and the secondary windings $3^a$, $3^b$ and $3^c$ connected in star. A three-phase supply is shown as an example, as this is the usual form of power supply but the invention is readily applicable to any single phase or any polyphase system, as will be appreciated by those skilled in the art. The left-hand portion of the drawing designated as control No. 1 serves to supply and control the uni-directional energy delivered to arc 1. The middle portion of the drawing designated as control No. 2 serves to supply and control the uni-directional energy supplied to arc 2. The right-hand portion of the drawing shows the switch control mechanism and interconnections whereby the arc machines may be operated individually, simultaneously and also with the control apparatus in parallel for supplying each arc machine.

Under the control No. 1 there is indicated three rectifying tubes $4^a$, $4^b$, and $4^c$ which may be of any suitable form or type, having anodes $5^a$, $5^b$, and $5^c$ and cathodes $6^a$, $6^b$, and $6^c$. The cathodes are indicated as having the usual windings $7^a$, $7^b$, and $7^c$ which supply heating energy to the cathodes as well understood by those skilled in the art. Anode reactor cores $8^a$, $8^b$, and $8^c$ which may be of any suitable form, have anode windings $9^a$, $9^b$, and $9^c$ connected respectively to the corresponding anodes of the rectifiers. These anode windings are connected to the corresponding phase windings of $3^a$, $3^b$, and $3^c$ of the secondary of the transformer. In the middle portion of the drawing is indicated a similar group of devices for forming control No. 2 and made up of the rectifiers $10^a$, $10^b$, and $10^c$ having anodes $11^a$, $11^b$, and $11^c$, cathodes $12^a$, $12^b$, and $12^c$ and cathode windings $13^a$, $13^b$, and $13^c$. Likewise there are indicated three anode reactor cores $14^a$, $14^b$, and $14^c$, having the anode windings $15^a$, $15^b$, and $15^c$. The latter are shown respectively connected between the anodes $11^a$, $11^b$, and $11^c$ and the secondary windings $3^a$, $3^b$, and $3^c$.

The common point of connection of the star connected secondary has connected thereto a lead N which forms the common negative return from the arcs of the two projector machines, the lower right-hand corner of the drawing showing this lead connected to the negative side of the arcs. The mid-points of the cathode windings $7^a$, $7^b$, and $7^c$ are connected together by a lead $P^1$ which forms the positive line leading to the projector machine of arc 1. The mid-points of the cathode windings $13^a$, $13^b$, and $13^c$ are connected together to form the positive line $P^2$ leading to the projector machine of arc 2. On each of the cores $8^a$, $8^b$, and $8^c$ is a control winding $16^a$, $16^b$, and $16^c$ which are connected in series with each other. One lead 17 from these series connected control windings extends to an adjustable contact $17^1$ which is adapted to contact successive points of a rheostat $18^1$. This rheostat is connected between the common negative line N and the positive lead $P^1$. From the mid-point of the resistance $18^1$ a lead $18^a$ extends to the other terminal of the series connected windings $16^a$, $16^b$, and $16^c$. Similar control windings $19^a$, $19^b$, and $19^c$ on the anode reactor cores $14^a$, $14^b$, and $14^c$ are connected in series with each other. A lead 20 from one terminal of these windings is connected to the adjustable contact $20^2$ of a resistance $21^2$ connected between the common negative N and the positive line $P^2$. The mid-point of this resistance $21^2$ is connected by a lead $21^a$ to the other terminal of the series connected control windings $19^a$, $19^b$, and $19^c$.

On each of the reactor cores $8^a$, $8^b$, and $8^c$ is an auxiliary compensating winding $22^a$, $22^b$, and $22^c$ which are connected in series with each other. One terminal of these windings is connected by a lead 23 to the common negative line N. The other terminal of these windings is connected to an adjustable resistance having sections 24 and 25. Engaging the section 25 is an adjustable contact $25^a$ which is connected to the positive lead $P^2$ of projector machine supplying arc 2. At an intermediate point between sections 24 and 25 of the resistance is an adjustable contact $25^b$ which, under certain connections of the switch control is adapted to include resistance 24, or a portion thereof, in circuit with the compensating windings $22^a$, $22^b$, and $22^c$. The adjustable contact $25^b$ is connected by a lead 26 to pivot contacts 27 and 28 of double-pole, double-throw, controlling switches $S^1$ and $S^2$. Similar compensating windings $29^a$, $29^b$, and $29^c$ are on the cores $14^a$, $14^b$, and $14^c$ of the anode reactors of control No. 2 and are likewise connected in series with each other and have one terminal connected by a lead 30 to the common negative of the equipment. The other terminal of the compensating windings is connected to a resistance having sections 31 and 32. An adjustable contact $32^a$ of resistance 32 is connected to the positive line $P^1$ of projector machine supply arc 1. An adjustable contact $32^b$ engages a point between the sections 31 and 32 of the variable resistances and in turn is connected to the pivot contacts 27 and 28 of the control switches $S^1$ and $S^2$. Now referring to the additional connections of the control switches $S^1$ and $S^2$, it will be seen that the positive line $P^1$ supplying the positive carbon of arc 1 is connected to the left-hand contact pivot point of switch $S^1$. When the switch $S^1$ is in its upper position, it connects its positive pivot line contact with the contact 33 which in turn is connected through the projector machine to the positive carbon of arc 1. Similarly, the positive line $P^2$ is connected to the left-hand pivot contact of switch $S^2$; and when this switch is in its upper closed position, it connects the positive line $P^2$ with the contact 34 which in turn is connected through the projector machine to the positive carbon of arc 2. When switch $S^1$ is in its lower position it engages contacts 35 which are connected together and to the positive line $P^2$. When the switch $S^2$ is in its lower position it engages the contacts 36 which are connected together and also connected to the line $P^1$.

It is apparent from the connections that the resistance $18^1$ and adjustable contact $17^1$ enable the value of the current as well as its direction to be adjusted in the control windings $16^a$, $16^b$, and $16^c$ so as to secure the desired adjustment of voltage applied to projector supplying arc 1 in accordance with the particular requirements of that machine for securing the best operative control of arc 1. As the resistance $18^1$ is connected between $P^1$ and N, this adjustment and control is independent of any control from the other portion of the equipment. The two direction arrows at the windings $16^a$, $16^b$, and $16^c$ indicate the capability of the current being caused to pass in either direction therethrough. Thus the magnetomotive force in these windings may be additive to or subtractive from the magnetomotive force of the anode reactor windings $9^a$, $9^b$, and $9^c$. Similarly, the control windings $19^a$, $19^b$, and $19^c$ are likewise controlled as to direction of current therethrough and as to value of the current by the adjustable contact $20^2$ giving a magnetomotiveforce either additive or in opposition to the magnetomotiveforces of the anode reactor windings $15^a$, $15^b$, and $15^c$ according to the requirements of the projector machine supplying arc 2 in order to secure the best operating effects for that machine.

As to the compensating windings $22^a$, $22^b$ and $22^c$ and $29^a$, $29^b$, and $29^c$ on the anode reactors, the action is quite different and depends upon which machine is operating individually, whether they are operating simultaneously and whether or not the rectifying sets are connected in parallel with each other. The direction of the magnetomotive-force set up by the compensating windings is always in a direction to oppose the magnetomotiveforce of the anode reactor windings respectively, this being indicated on the drawing by the arrows at the compensating windings being in a direction to oppose the arrows indicating the magnetomotiveforces of the anode reactor windings. In understanding the operation, it should also be appreciated that the adjustable contact $25^a$ is connected to the positive line $P^2$ of the projector supplying arc 2 and thereby controls the current in the compensating windings $22^a$, $22^b$, and $22^c$ of control No. 1. Similarly, the contact $32^a$ of resistance 32 is connected to the positive line $P^1$ supplying the positive carbon of arc 1 and controls the current in the compensating windings $29^a$, $29^b$, and $29^c$ of control No. 2.

In the operation of projector machines for moving pictures, the arc of the first projector is struck and runs for a certain time, usually about 20 minutes, for the length of one reel. About one minute before the end of this interval, the arc of the second projector is struck and begins its 20 minute operating period. About 2 minutes after the second projector has been struck, the first projector is cut off. In passing through these changes and when using a single transformer as a common source, the disturbance produced already referred to, must be compensated for to give the desired uniform operating conditions. Furthermore, if, when one machine is running alone, which is by far the greater portion of the time, the rectifiers 4ª, 4ᵇ, and 4ᶜ are placed in parallel with the rectifiers 10ª, 10ᵇ, and 10ᶜ, then obviously the load on the rectifiers and control equipment is reduced by one-half during most of the operating period.

In operation, let it first be assumed that the arc 1 is to be struck. Switch S¹ will then be closed in its upper position closing the circuit to arc 1. Contact 17¹ will then be adjusted to give the desired control of arc 1 through control of the current in windings 16ª, 16ᵇ, and 16ᶜ of the anode reactors. When arc 1 is operating and arc 2 is not operating, the compensating windings 22ª, 22ᵇ, and 22ᶜ of control No. 1 are having the maximum voltage applied to the circuit thereof because there is no load on arc 2. Consequently, compensating windings 22ª, 22ᵇ, and 22ᶜ being subjected to the voltage between P² and N by the connections already described, that is, from the common negative N through lead 23, windings 22ᶜ, 22ᵇ, and 22ª, resistance 24, resistance 25, contact 25ª and thence to positive lead P², exert a certain bucking effect. The adjustment of contact 17¹ may obviously be such as to take care of the effect of the compensating coils on the cores of the reactors of control No. 1. Parallel operation of the rectifiers when arc 1 is operating, is accomplished by throwing switch S² to its lower position. This connects the positive lines P¹ and P² together. This parallel operation would, if not compensated for, cause the voltage across arc 1 to rise and give a disturbing effect of the operation of arc 1. However, when the switch S² is moved to the lower position for parallel operation, it connects pivot contact 28 with contact 36, to which both positive lines P¹ and P² are connected. Consequently, by means of lead 37 which extends from switch contact 28 to the lead 26 and to the contact 25ᵇ being now connected to the common positive lines P¹ and P² results in short-circuiting the resistance section 25. Thus the reduced resistance of the circuit of the compensating windings with only resistance 24 in series therewith, results in increasing the current in the compensating coils during parallel operation. The resulting increased bucking effect in these coils will then, with the proper proportioning of the turns thereof and of the amount of resistance 24, cause the reactance of the anode windings 9ª, 9ᵇ, and 9ᶜ to be increased so that the resultant increase in voltage drop therein just compensates for the amount the voltage at arc 1 would otherwise increase due to the paralleling of the rectifier and their controls. Furthermore, with arc 2 not operating, the anode reactors of the control No. 2 are subjected to the same control and compensating effects when the rectifiers are placed in parallel on arc 1, as has been described with reference to control No. 1. That is, during parallel operation the compensating windings 29ª, 29ᵇ, and 29ᶜ are connected between the negative line N and the two positive lines P¹ and P² in series with the resistance section 31, as is evident by tracing the connections in the same way as described with reference to control No. 1. Thus both control No. 1 and control No. 2 are similarly and properly compensated for by means of the anode reactors during parallel operation.

Shortly before the end of the operation of arc 1 and near the end of its reel, the switch S² is thrown to open position with the change of compensating effect already referred to and without disturbing the desired condition of arc 1. Switch S² is then thrown to its upper position. This initiates the operation of arc 2 on its individual circuit. The placing of the load of arc 2 on rectifiers 10ª, 10ᵇ and 10ᶜ causes a drop in voltage between the common negative and positive line P² as well as causing a drop in voltage in the transformer windings and anode reactors. This change, however, does not disturb the operation of arc 1 because the decreased voltage between the negative line and the positive line P² causes a decreased voltage to the applied to the circuit of the compensating windings 22ª, 22ᵇ and 22ᶜ including the resistances 24 and 25 so that a decreased bucking current flows in these compensating windings as compared with the condition when arc No. 1 was operating alone. The resulting decreased bucking effect decreases the reactance of the anode windings 9ª, 9ᵇ, and 9ᶜ so that less voltage drop occurs therein when both arcs are simultaneously and individually operated than when arc No. 1 was operating alone. Thus the drop in voltage which would otherwise occur when the arcs are simultaneously operated is compensated for by maintaining the desired voltage on arc No. 1. Likewise, when arc No. 2 is operated in conjunction with arc No. 1, the voltage of arc No. 2 is maintained at the desired value because the compensating windings 29ª, 29ᵇ, and 29ᶜ are acting the same way on the anode reactors of its rectifiers as already explained with reference to control No. 1.

After a short interval of simultaneous operation of the arcs and arc 2 is in condition to act alone on its reel, the switch S¹ is opened. This tends to increase the voltage applied to control No. 2 due to transformer regulation. Such tendency is, however, counteracted by the increase of current in the compensating windings 29ª, 29ᵇ, and 29ᶜ which occurs upon the opening of switch S¹. This increase is due to the fact that when the load is removed from control No. 1, the output voltage of its rectifiers is increased, increasing the voltage between the common negative and the positive line P¹. As the windings 29ª, 29ᵇ, and 29ᶜ are connected across this circuit, the increased voltage thereof will cause the increase in current. This increase in current increases the reactance of anode windings 15ª, 15ᵇ, and 15ᶜ causing an increased voltage drop therein with the result that the voltage of arc 2 is not disturbed by the cessation of operation of arc 1.

As arc 2 is to now have a long period of individual operation during the passing of its reel, switch S¹ is thrown to its lower position for securing parallel operation of the rectifiers and anode controlling means of both controls. The condition is then similar to that already described when arc 1 was supplied by parallel operation of the two controls. That is, the compensating windings are then connected between the common negative and the positive lines P¹ and P² which are now connected together, and the compensating windings include in their circuits respectively the resistances 24 and 31 only, giving the desired increase in current in the compensating windings in order to increase their bucking effect and increase the voltage drop in all of the anode windings during parallel operation, as already explained when the condition of parallel operation for arc 1 was described.

Near the end of the period of operation of arc 2, switch S¹ will first be placed in open position placing arc 2 on its individual control No. 2 with the compensating change occurring as already described in connection with control of arc 1. Switch S¹ is then moved to its upper position giving simultaneous operation of the arcs for a short period with the compensating action taking place as already described and then switch S² is thrown from its upper position to open position with the compensating results again occurring. Switch S² is then moved to its lower position placing both controls in parallel to supply arc 1 with the compensating effect already described.

Thus it will be seen that at each sequential step of control through the entire cycle of operations, the compensating effect upon the occurrence of each change is just sufficient to maintain the desired voltage upon the arcs of the two machines during all periods of their operation. In obtaining this result it will, of course, be understood that the resistances 24 and 31 and 25 and 32 have been determined to be of the correct amounts for proper operation and after they are once arrived at they need not be made adjustable. It will also be understood that the adjustable contacts 17¹ and 20² are movable by the operator to give the required arc voltage depending upon the conditions and type of machine. Furthermore, this improvement not only acts to give proper compensation of voltage during the different sequential steps of operation of the two machines, but likewise insures the maintenance of the wave form to which the rectifiers are subjected within such limits that no appreciable disturbance of the condition of the arcs occur from wave form distortion.

Although a typical embodiment of this invention has been described, it is evident that various applications thereof may be made, such as the control of other loads than arc loads, and that various modifications may be made and that various types and forms of apparatus may be used without departing from the scope of the invention.

I claim:—

1. An alternating current source, a plurality of rectifying devices supplied with energy from said source, a plurality of consumption circuits supplied with energy from said devices respectively, means for placing a plurality of said devices in parallel for supplying one of said circuits, and controlling means for maintaining the output voltage of said devices in parallel approximately the same as before the parallel connection.

2. An alternating current source, a plurality of rectifying devices supplied with energy from said source, a plurality of consumption circuits supplied with energy from said devices respectively, and controlling means for maintaining the output voltage of each of said devices approximately constant upon change of load of any one of said circuits and upon placing said devices in parallel to supply any one of said consumption circuits.

3. An alternating current source, a plurality of rectifying devices supplied with energy from said source, a plurality of consumption circuits supplied with energy from said devices respectively, reactive means in the anode circuits of said rectifying devices respectively, and a compensating winding for affecting each of said means responsive to the output voltage of another of said devices.

4. An alternating current source, a plurality of rectifying devices supplied with energy from said source, a plurality of consumption circuits supplied with energy from said devices respectively, reactive means in the anode circuits of said rectifying devices respectively, and controlling means for affecting each of said reactive means upon placing said devices in parallel to supply any one of said circuits.

5. A transformer, a plurality of rectifying devices supplied with energy from said transformer, a plurality of consumption circuits supplied with energy from said devices respectively, an anode reactor in the anode circuits of said devices respectively, and a compensating winding on each of said reactors respectively, said compensating windings being responsive to the output voltage of another of said devices than the one controlled by its reactor.

6. A transformer, a plurality of rectifying devices supplied with energy from said transformer, a plurality of consumption circuits supplied with energy from said devices respectively, an anode reactor in the anode circuits of said devices respectively, and a compensating winding on each of said reactors respectively, said compensating windings being responsive to the output voltage of another of said devices than the one controlled by its reactor and having its magneto-motive force opposing that of its reactor.

7. A transformer, a plurality of rectifying devices supplied with energy from said transformer, a plurality of consumption circuits supplied with energy from said devices respectively, an anode reactor in the anode circuits of said devices respectively, and controlling means for placing a plurality of said devices in parallel and for then increasing the reactance of said reactors.

8. A transformer, a plurality of rectifying devices supplied with energy from said transformer, a plurality of consumption circuits supplied with energy from said devices respectively, an anode reactor in the anode circuits of said devices respectively, a compensating winding on each of said reactors respectively, said compensating windings being responsive to the output voltage of another of said devices than the one controlled by its reactor, and controlling means for placing a plurality of said devices in parallel and for then increasing the reactance of said reactors.

9. A transformer, a plurality of rectifying devices supplied with energy from said transformer, a plurality of consumption circuits supplied with energy from said devices respectively, an anode reactor in the anode circuits of said devices respectively, a winding on said reactors respectively for individually adjusting the output voltages of said devices, a second winding on said reactors respectively responsive to the output voltage of another of said devices than the one controlled by its reactor, and controlling means for placing a plurality of said devices in parallel and for then affecting the current in said second windings for maintaining an approximately constant output voltage from said devices.

10. A transformer, a plurality of rectifying devices supplied with energy from said transformer, a plurality of consumption circuits supplied with energy from said devices respectively, an anode reactor in the anode circuits of said devices respectively, a winding on said reactors respectively for individually adjusting the output voltages of said devices, a second winding on said reactors respectively responsive to the output voltage of another of said devices than the one controlled by its reactor, and controlling means for placing a plurality of said devices in parallel and for inserting impedance in the circuit of said second windings.

11. A transformer, a plurality of rectifying devices supplied with energy from said transformer, a plurality of consumption circuits supplied with energy from said devices respectively, an anode reactor in the anode circuits of said devices respectively, a winding on said reactors respectively for individually adjusting the output voltages of said devices, a second winding on said reactors respectively responsive to the output voltage of another of said devices than the one controlled by its reactor and having its magnetomotiveforce opposing that of its reactor, and controlling means for placing a plurality of said devices in parallel and for then affecting the current in said second windings for maintaining an approximately constant output voltage from said devices.

12. A transformer, a plurality of rectifying devices supplied with energy from said transformer, a plurality of consumption circuits supplied with energy from said devices respectively, an anode reactor in the anode circuits of said devices respectively, a winding on said reactors respectively for individually adjusting the output voltages of said devices, a second winding on said reactors respectively responsive to the output voltage of another of said devices than the one controlled by its reactor and having its magnetomotiveforce opposing that of its reactor, and controlling means for placing a plurality of said devices in parallel and for inserting impedance in the circuit of said second windings.

13. An alternating current source, a plurality of rectifying devices supplied with energy from said source, a plurality of consumption circuits supplied with energy from said devices respectively, reactive means in the anode circuits of said rectifying devices respectively, and a compensating winding for affecting each of said means responsive to the output voltage of another of said devices for decreasing the reactance of said means upon decrease of said output voltage and for increasing the reactance thereof upon increase of said output voltage.

14. An alternating current source, a plurality of rectifying devices supplied with energy from said source, a plurality of consumption circuits each individually and separately supplied with energy from said devices respectively, and a plurality of individual controlling means, one for individually and separately controlling each of said devices respectively, each of said means being responsive to the electrical condition of the output of another of said devices.

15. An alternating current source, a plurality of rectifying devices supplied with energy from said source, a plurality of consumption circuits each individually and separately supplied with energy from said devices respectively, and a plurality of individual controlling means, one for individually and separately controlling each of said devices respectively, each of said means being responsive to the output voltage of another of said devices.

16. An alternating current source, a plurality of rectifying devices supplied with energy from said source, a plurality of consumption circuits each individually and separately supplied with energy from said devices respectively, and a plurality of individual controlling means one for individually and separately controlling each of said devices respectively for maintaining the output voltage of each of said devices approximately constant upon change of load of any one of said circuits.

FRANK G. LOGAN.